US007689867B2

(12) United States Patent
Rosenbluth et al.

(10) Patent No.: US 7,689,867 B2
(45) Date of Patent: Mar. 30, 2010

(54) MULTIPROCESSOR BREAKPOINT

(75) Inventors: Mark B. Rosenbluth, Uxbridge, MA (US); Xiao-Feng Li, Beijing (CN); Dz-ching (Roy) Ju, Saratoga, CA (US); Aaron R. Kunze, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1088 days.

(21) Appl. No.: 11/148,804

(22) Filed: Jun. 9, 2005

(65) Prior Publication Data

US 2006/0282707 A1 Dec. 14, 2006

(51) Int. Cl.
*G06F 11/00* (2006.01)

(52) U.S. Cl. ............................ 714/34; 714/35

(58) Field of Classification Search .................. 714/34, 714/35
See application file for complete search history.

(56) References Cited

U.S. PATENT DOCUMENTS 5,038,275 A * 8/1991 Dujari .......................... 710/19
5,678,003 A * 10/1997 Brooks ......................... 714/34
7,222,264 B2 * 5/2007 Muratori et al. ............... 714/35
2002/0162051 A1 * 10/2002 Bolding et al. ................ 714/34
2004/0015929 A1 * 1/2004 Lewis et al. .................. 717/156
2005/0188186 A1 * 8/2005 Wolczko et al. .............. 712/227

FOREIGN PATENT DOCUMENTS

WO WO 2004017204 A2 * 2/2004

* cited by examiner

*Primary Examiner*—Yolanda L Wilson
(74) *Attorney, Agent, or Firm*—Caven & Aghevli LLC

(57) ABSTRACT

Techniques that may be utilized in a multiprocessor system are described. In one embodiment, one or more signals are generated to indicate that a breakpoint instruction is executed by one of the plurality of processors in the multiprocessor system. For example, a signal may be generated to indicate whether a processor is to be halted once it receives the a signal that indicates the breakpoint instruction. Other embodiments are also disclosed.

23 Claims, 7 Drawing Sheets

MULTIPROCESSOR BREAKPOINT

BACKGROUND

Writing computer code generally involves a debugging stage before the code can be successfully executed on hardware. Software debuggers may be utilized to assist in identifying portions of the code that cause catastrophic failures and/or generate inappropriate results. When debugging sequential code, once the code reaches a breakpoint (also referred to as a breakpoint instruction), the code execution is suspended. At this point, a software engineer may examine various information regarding the execution of the code, including contents of memory, register files, or other variables or states. The debugger generally expects the examined information to correctly reflect the code execution states just before the breakpoint. The programmer may then utilize this information to determine what changes are to be made to the code to address any existing issues.

When debugging computer code that runs in parallel (e.g., multithreaded application programs) on multiple processing elements (e.g., processor cores), however, specialized hardware may have to be utilized. Examples of the specialized hardware include an in-circuit emulator (ICE) and a Joint Test Access Group (JTAG) port. Utilization of such hardware, however, increases the manufacturing costs of processors because additional circuitry is included on each processing element. The additional circuitry may also reduce the footprint available to include other functionality on the processor. Furthermore, a debugger may need to be knowledgeable about both software debuggers and the specialized hardware to effectively debug the parallel code. Finally, the software engineer needs access to debugging hardware beyond the processor, adding to the cost of software development.

Additionally, current breakpoint support for multithreaded application debugging either does not stop the other threads (besides the breakpoint thread that is executing the breakpoint instruction), especially if those other threads are running on different processing elements than the breakpoint thread, or else uses underlying inter-thread communication (ITC) for breakpoint event propagation from the breakpoint thread to other threads running on other processing elements. Since the ITC mechanism is implemented primarily in software, the breakpoint event propagation may incur a relatively long delay compared to the thread execution. Thus, when a non-breakpoint thread is notified of the breakpoint event, it may already be context-switched multiple times and hence the thread states may be quite different from when the breakpoint is reached.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Figure 1A:
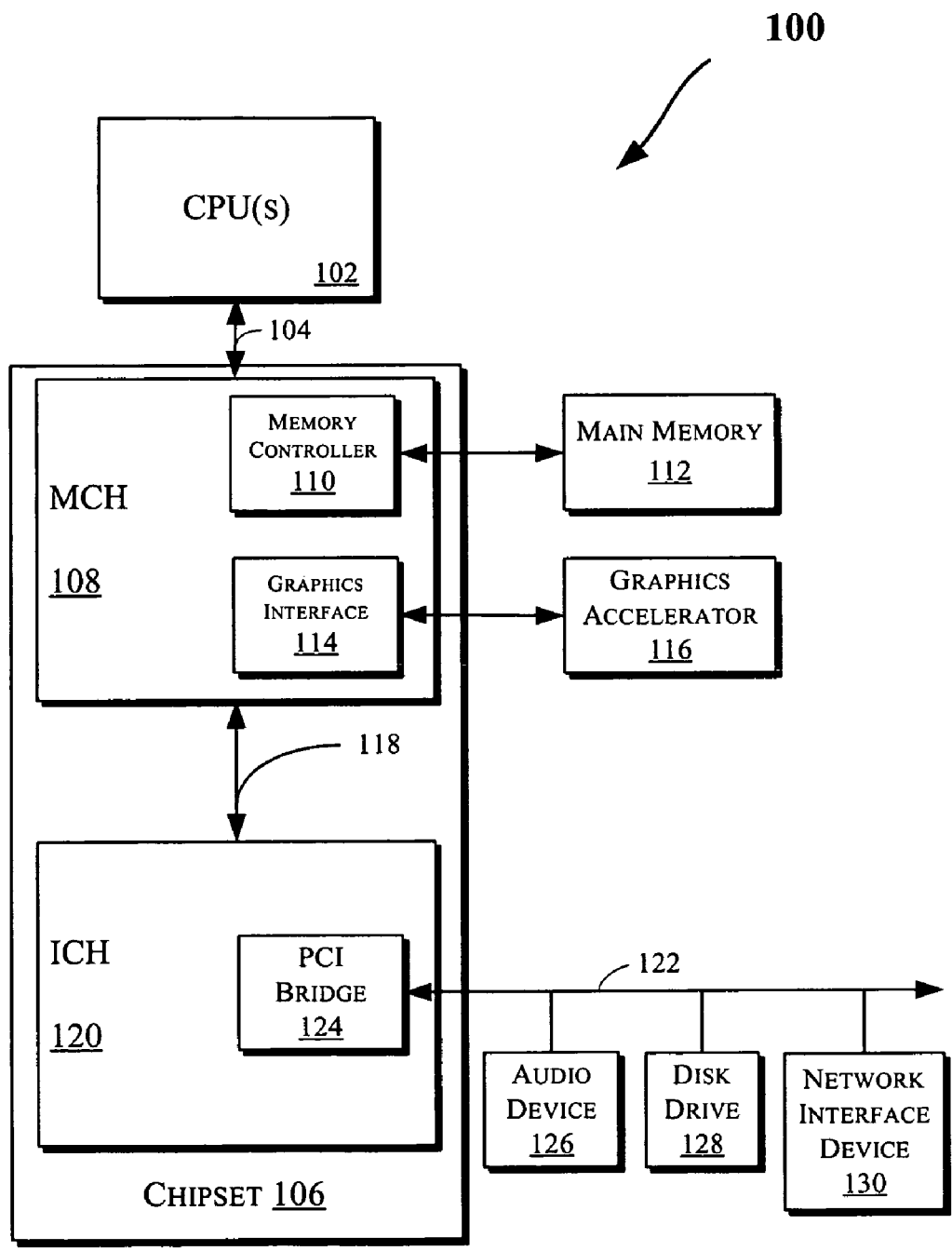
FIGS. 1A-1B illustrate block diagrams of computing systems in accordance with embodiments of the invention.

FIG. 1A illustrates a block diagram of a computing system 100 in accordance with an embodiment of the invention. The computing system 100 includes one or more central processing unit(s) (CPUs) 102 or processors coupled to an interconnection network (or bus) 104. The processors (102) may be any suitable processor such as a general purpose processor, a network processor, or the like (including a reduced instruction set computer (RISC) processor or a complex instruction set computer (CISC)). Moreover, the processors (102) may have a single or multiple core design. The processors (102) with a multiple core design may integrate different types of processor cores on the same integrated circuit (IC) die. Also, the processors (102) with a multiple core design may be implemented as symmetrical or asymmetrical multiprocessors.

A chipset 106 may also be coupled to the interconnection network 104. The chipset 106 includes a memory control hub (MCH) 108. The MCH 108 may include a memory controller 110 that is coupled to a main system memory 112. The main system memory 112 may store data and sequences of instructions that are executed by the CPU 102, or any other device included in the computing system 100. In one embodiment of the invention, the main system memory 112 may include one or more volatile storage (or memory) devices such as random access memory (RAM), dynamic RAM (DRAM), synchronous DRAM (SDRAM), static RAM (SRAM), or the like. Nonvolatile memory may also be utilized such as a hard disk. Additional devices may be coupled to the interconnection network 104, such as multiple CPUs and/or multiple system memories.

The MCH 108 may also include a graphics interface 114 coupled to a graphics accelerator 116. In one embodiment of the invention, the graphics interface 114 may be coupled to the graphics accelerator 116 via an accelerated graphics port (AGP). In an embodiment of the invention, a display (such as a flat panel display) may be coupled to the graphics interface 114 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 118 may couple the MCH 108 to an input/output control hub (ICH) 120. The ICH 120 provides an interface to input/output (I/O) devices coupled to the computing system 100. The ICH 120 may be coupled to a peripheral component interconnect (PCI) bus 122. Hence, the ICH 120 includes a PCI bridge 124 that provides an interface to the PCI bus 122. The PCI bridge 124 provides a data path between the CPU 102 and peripheral devices. Additionally, other types of topologies may be utilized.

The PCI bus 122 may be coupled to an audio device 126, one or more disk drive(s) 128, and a network interface device 130. Other devices may be coupled to the PCI bus 122. Also, various components (such as the network interface device 130) may be coupled to the MCH 108 in some embodiments of the invention. Moreover, network communication may be established via internal and/or external network interface device(s) (130), such as a network interface card (NIC). In addition, the CPU 102 and the MCH 108 may be combined to form a single chip. Furthermore, the graphics accelerator 116 may be included within the MCH 108 in other embodiments of the invention.

Additionally, other peripherals coupled to the ICH 120 may include, in various embodiments of the invention, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), or the like.

Hence, the computing system 100 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 128), a floppy disk, a compact disk ROM (CD-ROM), a digital versatile disk (DVD), flash memory, a magneto-optical disk, or other types of nonvolatile machine-readable media suitable for storing electronic instructions and/or data.

Figure 1B:
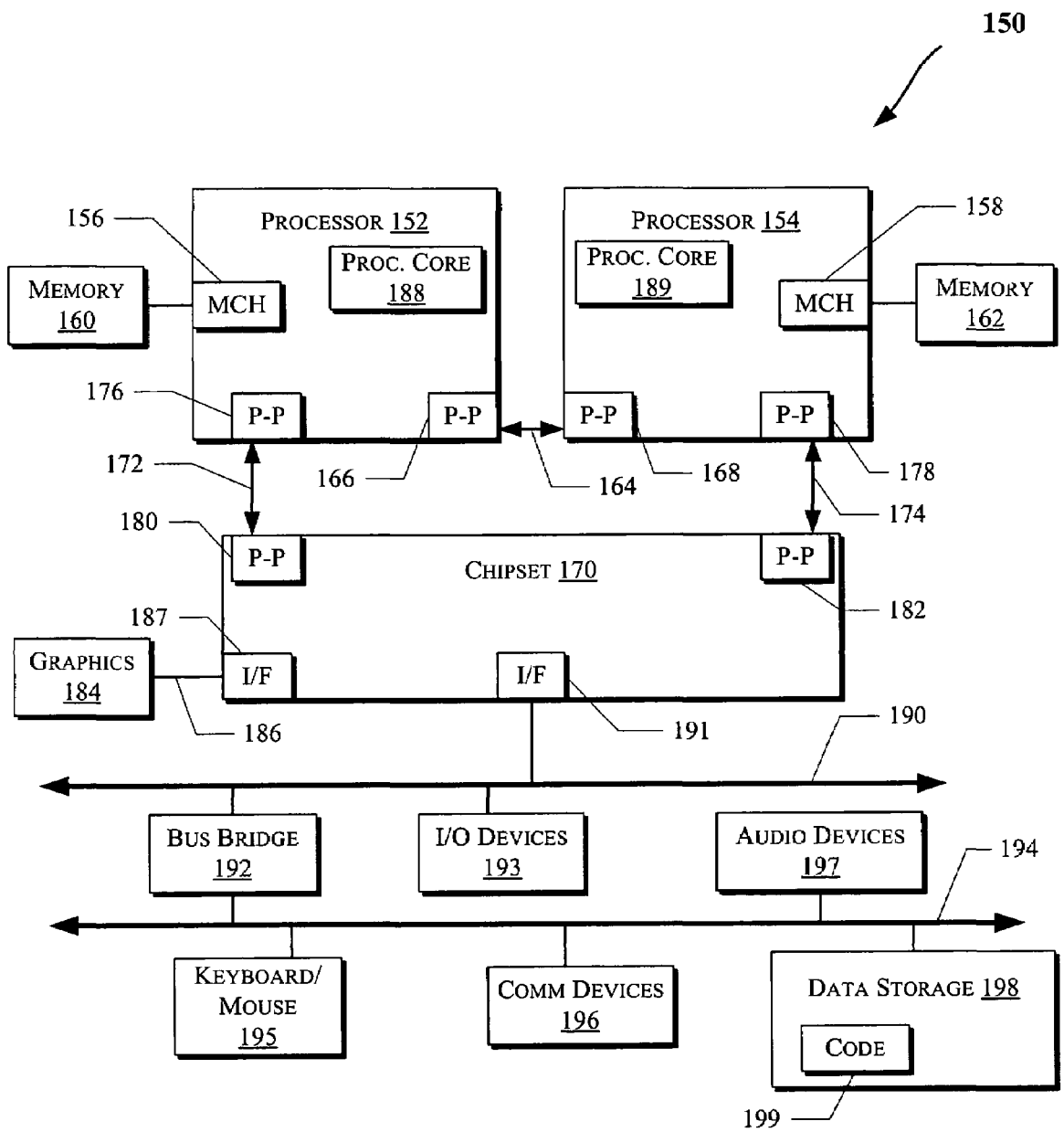

FIG. 1B illustrates a computing system 150 that is arranged in a point-to-point (PtP) configuration, according to an embodiment of the invention. In particular, FIG. 1B shows a system where processors, memory, and input/output devices are interconnected by a number of point-to-point interfaces.

The system 150 of FIG. 1B may also include several processors, of which only two, processors 152 and 154 are shown for clarity. The processors 152 and 154 may each include a local memory controller hub (MCH) 156 and 158 to couple with memory 160 and 162. The processors 152 and 154 may be any suitable processor such as those discussed with reference to the processors 102 of FIG. 1A. The processors 152 and 154 may exchange data via a point-to-point (PtP) interface 164 using PtP interface circuits 166 and 168, respectively. The processors 152 and 154 may each exchange data with a chipset 170 via individual PtP interfaces 172 and 174 using point to point interface circuits 176, 178, 180, and 182. The chipset 170 may also exchange data with a high-performance graphics circuit 184 via a high-performance graphics interface 186, using a PtP interface circuit 187.

At least one embodiment of the invention may be located within the processors 152 and 154. Other embodiments of the invention, however, may exist in other circuits, logic units, or devices within the system 150 of FIG. 1B. Furthermore, other embodiments of the invention may be distributed throughout several circuits, logic units, or devices illustrated in FIG. 1B.

The chipset 170 may be coupled to a bus 190 using a PtP interface circuit 191. The bus 190 may have one or more devices coupled to it, such as a bus bridge 192 and I/O devices 193. Via a bus 194, the bus bridge 193 may be coupled to other devices such as a keyboard/mouse 195, communication devices 196 (such as modems, network interface devices, or the like), audio I/O device, and/or a data storage device 198. The data storage device 198 may store code 199 that may be executed by the processors 152 and/or 154.

Figure 2:
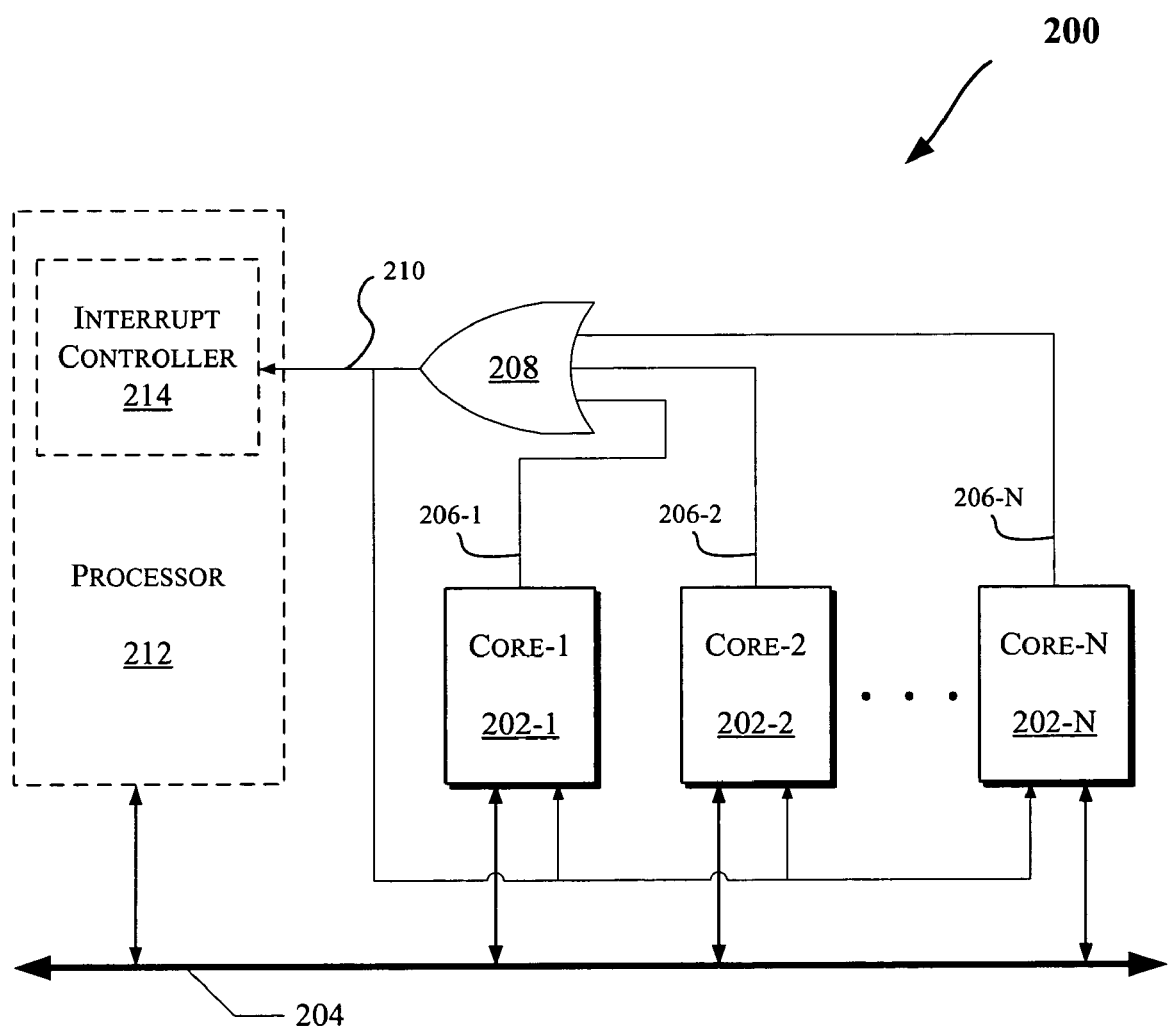
FIG. 2 illustrates a block diagram of portions of a multiprocessor system, in accordance with an embodiment of the invention.

FIG. 2 illustrates a block diagram of portions of a multiprocessor system 200, in accordance with an embodiment of the invention. In one embodiment of the invention, the CPUs 102 of FIG. 1A or processors 152-154 of FIG. 1B include the multiprocessor system 200. The multiprocessor system 200 may be a multi-core processor in one embodiment. Also, one or more processor cores (such as the multiprocessor system 200) may be implemented on a single IC die. Moreover, the die may include shared or private cache(s), an interconnect, a memory controller, or the like.

As illustrated in FIG. 2, the multiprocessor system 200 may include one or more processor cores 202 (e.g., 202-1 through 202-N). The processor cores 202 may be any suitable processor such as those discussed with reference to the processors 102 of FIG. 1A or 152-154 of FIG. 1B. Hence, in an embodiment, each processor core 202 may be a RISC processor. Each of the processor cores 202 may be implemented on a separate IC die in one embodiment. Furthermore, each of the processor cores (202) may execute one thread of a multithreaded application program. Additionally, the processor cores 202 may have one or more states, including inactive (or halted), ready (e.g., awaiting code to execute), sleep (e.g., to save power while the core remains unutilized), and/or executing (e.g., executing instructions).

As illustrated in FIG. 2, the processor cores 202 may communicate with each other indirectly or directly, e.g., through a bus 204 (such as the bus 104 of FIG. 1A) or a PtP interface (e.g., the PtP interfaces 172 and 174 discussed with reference to FIG. 1B), respectively. The multiprocessor system 200 may also include one or more shared memory devices (not shown) that may be shared by the processor cores 202 in one embodiment of the invention, such a level 1 (L1) cache, a level 2 (L2) cache, or the like to store instructions and/or data that are utilized by one or more components of the multiprocessor system 200. The memory devices utilized by components of the multiprocessor system 200 may be volatile and/or nonvolatile (such as those discussed with reference to FIG. 1A). Alternatively, the memory may reside within each processor core 202 or each core may have access to its own memory (such as the processor 152 and its memory 160 which were discussed with reference to FIG. 1B). Furthermore, various components of the multiprocessor system 200 may be coupled to the shared memory directly, through a bus (e.g., the bus 204), and/or memory a controller or hub (e.g., the memory controller 110 of FIG. 1A and MCH 108 of FIG. 1A and MCH 156-158 of FIG. 1B).

In an embodiment, once one of the processor cores 202 executes a breakpoint instruction, that processor core halts and generates a signal 206 (e.g., 206-1 through 206-N) indicative of having reached a breakpoint. The breakpoint instruction may be ctx_arb[bpt], in accordance with at least one instruction set architecture. As illustrated in FIG. 2, signals 206 (e.g., 206-1 through 206-N) from one or more of the processor cores 202 may be logically OR-ed (e.g., by an OR gate 208) to generate a signal 210 that indicates whether any of the processor cores 202 have executed a breakpoint instruction. The signal 210 may be provided to one or more of the processor cores 202, e.g., to request that one or more of the remaining un-halted processor cores halt their activities to enable debugging of the multithreaded application program running on one or more processors of the multiprocessor system 200. Accordingly, signals 206 and 210 may be generated and communicated, e.g., asynchronously or independent of an execution state of the one or more processors of the multiprocessor system 200. Moreover, the signals 206 and 210 may be generated and communicated without utilizing the bus 204 which may introduce delays in propagating the occurrence of the breakpoint to other processors of the multiprocessor system 200. Such an implementation may reduce the processing activity by the other processors of the multiprocessor system 200 (such as possible context (or thread) switching by the processor cores 202) in the period between reaching a breakpoint on one processor core (202) and the rest of the contexts (e.g., running on other processor cores) halting.

In one embodiment, the multiprocessor system 200 may optionally include a processor 212, e.g., to perform various general tasks within the multiprocessor system 200. For example, the multiprocessor system 200 may be utilized in a network processor and the processor 212 may manage various components of the multiprocessor system 200. In such an embodiment, the processor cores 202 may be microengines (MEs). The processor 212 may include an interrupt controller 214 that receives the signal 210. The interrupt controller 214 communicates with one or more of the processor cores 202 (e.g., through the bus 204) to request that they halt execution of their threads.

Figure 3:
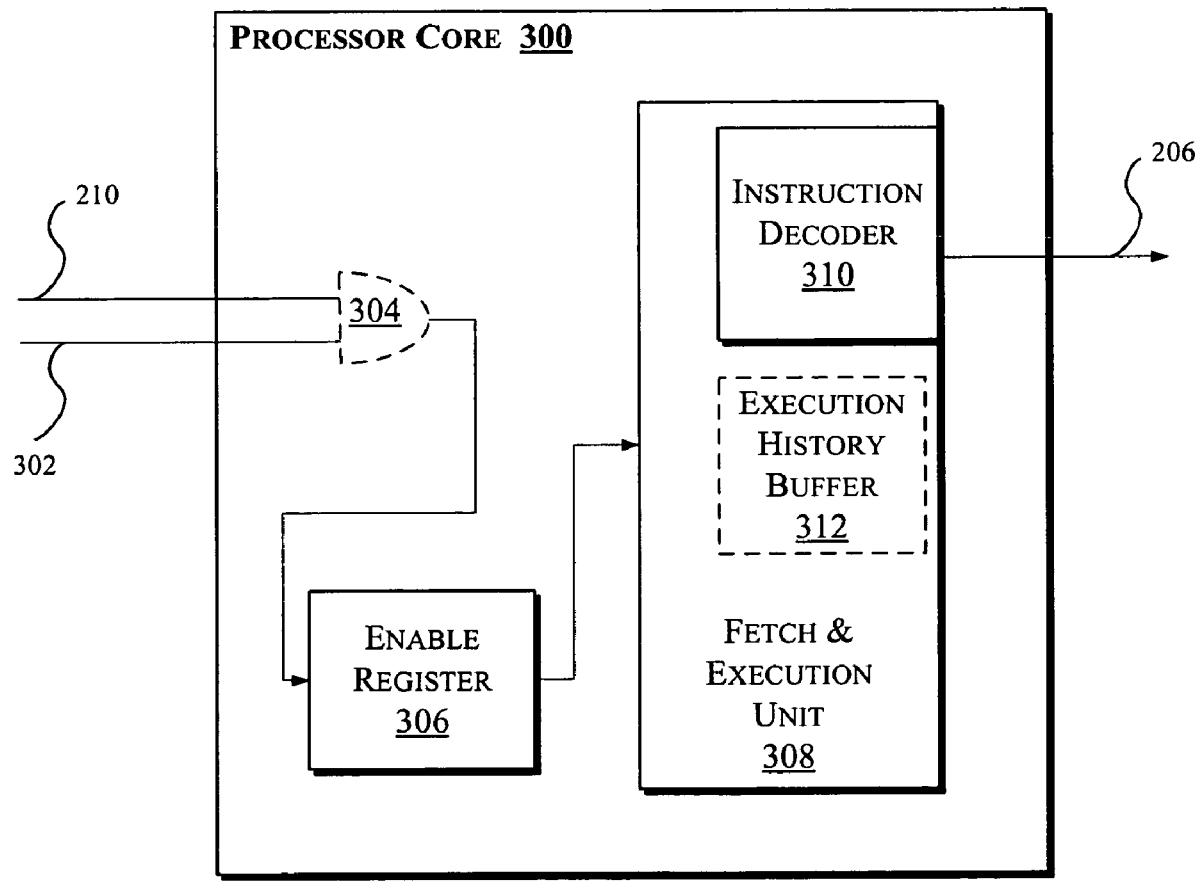
FIG. 3 illustrates a block diagram of portions of a processor core, in accordance with an embodiment of the invention.

FIG. 3 illustrates a block diagram of portions of a processor core 300, in accordance with an embodiment of the invention. In one embodiment, the processor core 300 is the same or similar to the processor cores 202 discussed with reference to FIG. 2. The processor core 300 optionally includes an AND gate 304 to logically AND the signal 210 of FIG. 2 (which indicates whether one or more of the processor cores 202 have executed a breakpoint instruction) and a halt enable signal 302 (e.g., to indicate whether the operation of the processor core 300 is to be halted once it receives the signal 210). Hence, in one embodiment, the processor cores 202 of FIG. 2 may be selectively enabled to be halted upon execution of a breakpoint instruction on one of the processor cores 202 of FIG. 2.

The output of the AND gate 304 may be provided to a control register such as an enable register 306, e.g., to clear or set one or more bits of the register 306 to indicate whether the processor core 300 is to be halted. The register 306 may have any suitable length. The core 300 may further include a fetch and execution unit 308 coupled to the register 306, e.g., to fetch and execute one or more instructions stored in memory (such as those discussed with reference to FIGS. 1-2). Once given bits of the register 306 are set (or cleared, depending on the implementation) to indicate that the core 300 is to be halted, the fetch and execution unit 308 may halt the core 300.

The fetch and execution unit 308 may include an instruction decoder 310 to decode one or more fetched instructions. If the instruction decoder 310 decodes a breakpoint instruction (e.g., during the execution of an instruction), the signal 206 may be generated to indicate that the core 300 has reached a breakpoint, such as discussed with reference to FIG. 2. The fetch and execution unit 308 may optionally include an execution history buffer 312 to store the last few context (or thread) switch events and/or branches. In case there is a context switch in the period between reaching a breakpoint on one processor core (202) and the rest of the contexts (e.g., running on other processor cores) halting, debugger users may trace back that thread's activities by referring to the execution history buffer 312. In an embodiment, since the chance of a context switch event occurring during the period of breakpoint event propagation (between the processor cores 202 of FIG. 2) may be a few cycles, the buffer 312 may store a small number of entries (e.g., five entries) regarding the context switch events.

Figure 4:
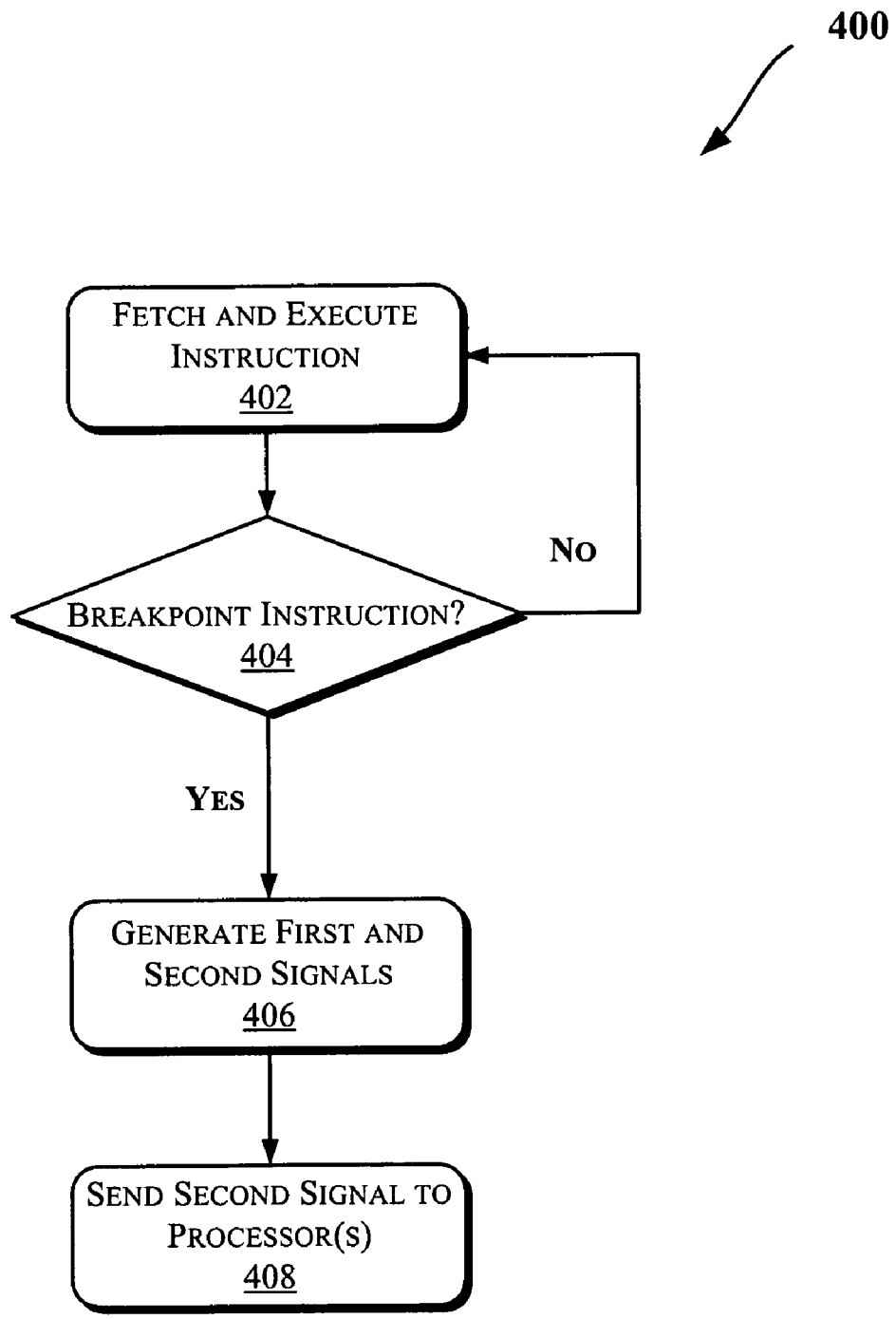
FIG. 4 illustrates a flow diagram of an embodiment of a method for indicating to one or more processors of a multiprocessor system that a breakpoint has been reached by at least one processor of the system.

FIG. 4 illustrates a flow diagram of a method 400 for indicating to one or more processors of a multiprocessor system that a breakpoint has been reached by at least one processor of the system, in accordance with an embodiment of the invention. As will be further discussed with reference to FIG. 5, the method 400 may be utilized to halt one or more processors of a multiprocessor system, such as the processor cores 202 (or processor 212) of FIG. 2, processors 102 of FIG. 1A, and/or the processors 152 and 154 of FIG. 1B.

As a processor (such as the processor cores 202 (or processor 212) of FIG. 2, processors 102 of FIG. 1A, and/or the processors 152 and 154 of FIG. 1B) fetches and executes instructions (402), it is determined whether a breakpoint instruction has been reached (404), e.g., by the fetch and execution unit 308 (or the instruction decoder 310) of FIG. 3. If a breakpoint instruction is not reached (404), the method 400 continues with fetching and executing subsequent instruction (402). Otherwise, a first signal is generated (406) to indicate that a breakpoint has been reached (such the signals 206 of FIG. 2). A second signal may also be generated (406) to indicate that at least one processor (or processor core) in a multiprocessor system (such as the system 200 of FIG. 2) has reached a breakpoint. In one embodiment, the second signal may be the signal 210 of FIG. 2 that is generated by the OR gate 208. The second signal may be sent to one or more processors or processor cores (408) in a multiprocessor system, such as the processor cores 202 (or processor 212) of FIG. 2, processors 102 of FIG. 1A, and/or the processors 152 and 154 of FIG. 1B.

Figure 5:
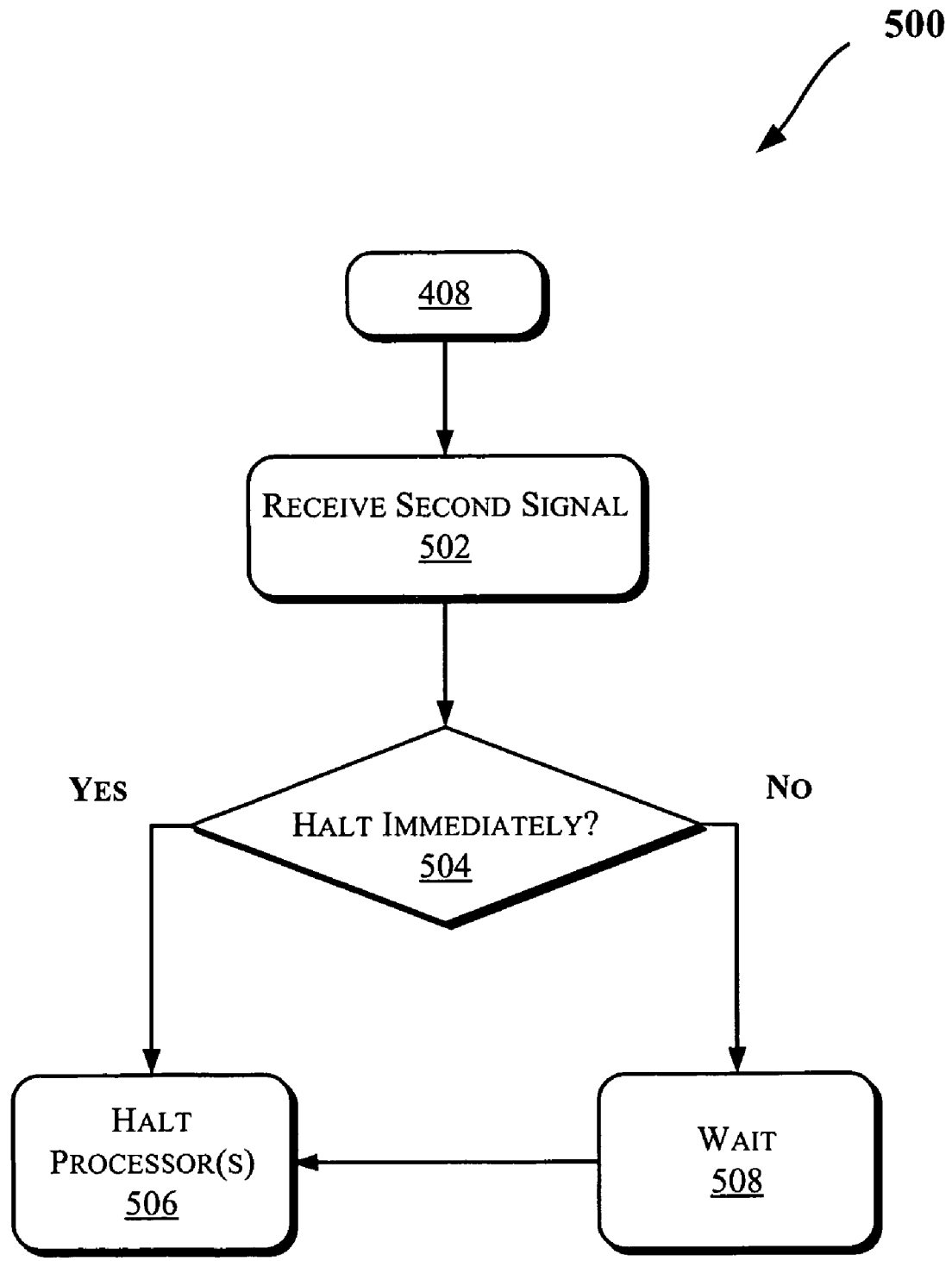
FIG. 5 illustrates a flow diagram of an embodiment of a method for halting one or more processors of a multiprocessor system in response to a breakpoint reached by at least one processor of the system.

FIG. 5 illustrates a flow diagram of a method 500 for halting one or more processors of a multiprocessor system in response to a breakpoint reached by at least one processor of the system, in accordance with an embodiment of the invention. Once a processor of a multiprocessor system (such as the processors and/or cores discussed with reference to FIGS. 1-4) receives the second signal (502), discussed with reference to stage 408 of FIG. 4, it is determined whether the processor should immediately halt execution of its thread (504). If the processor is to be immediately halted, the method 500 halts that processor (506).

As discussed with reference to FIG. 3, each processor or core may be selectively enabled to be halted (e.g., by utilizing the halt enable signal 302). Also, each processor or core may be selectively allowed to continue execution of its thread until it reaches a new instruction (and then may prevent subsequent threads from executing). For example, the signal 210 of FIG. 2 may be utilized to clear portions of one or more registers (e.g., the register 306 of FIG. 3), such as clearing ctx_enables in accordance with at least one instruction set architecture. Hence, if it is determined that the processor should not immediately halt (504), the method 500 may wait for one or more events (such as reaching a breakpoint) prior to halting the processor (508) at the stage 506.

Furthermore, in-flight I/O and/or memory accesses (e.g. SRAM write, DRAM read, etc.) may have executed prior to reaching the breakpoint and may be at various stages such as: (1) command in processor command buffer; (2) command in memory controller command buffer; (3) write data is in memory controller write buffer (e.g., waiting to be written to the memory); and/or (4) read data is in memory controller read buffer (e.g., to be sent to the processor via a bus). In one embodiment, these in-flight I/O and/or memory accesses may be allowed to finish executing even after a processor is halted.

In one embodiment, one or more processors of a multiprocessor system (e.g., the system 200 of FIG. 2) may be halted when one of the processors executes a breakpoint instruction. Hence, such an embodiment may be referred to as a global breakpoint implementation. A software debugger may perform multithreaded application debugging since the techniques discussed herein may provide that during the period from reaching a breakpoint until select threads are halted, there have been few, or no, context switches.

Figure 6:
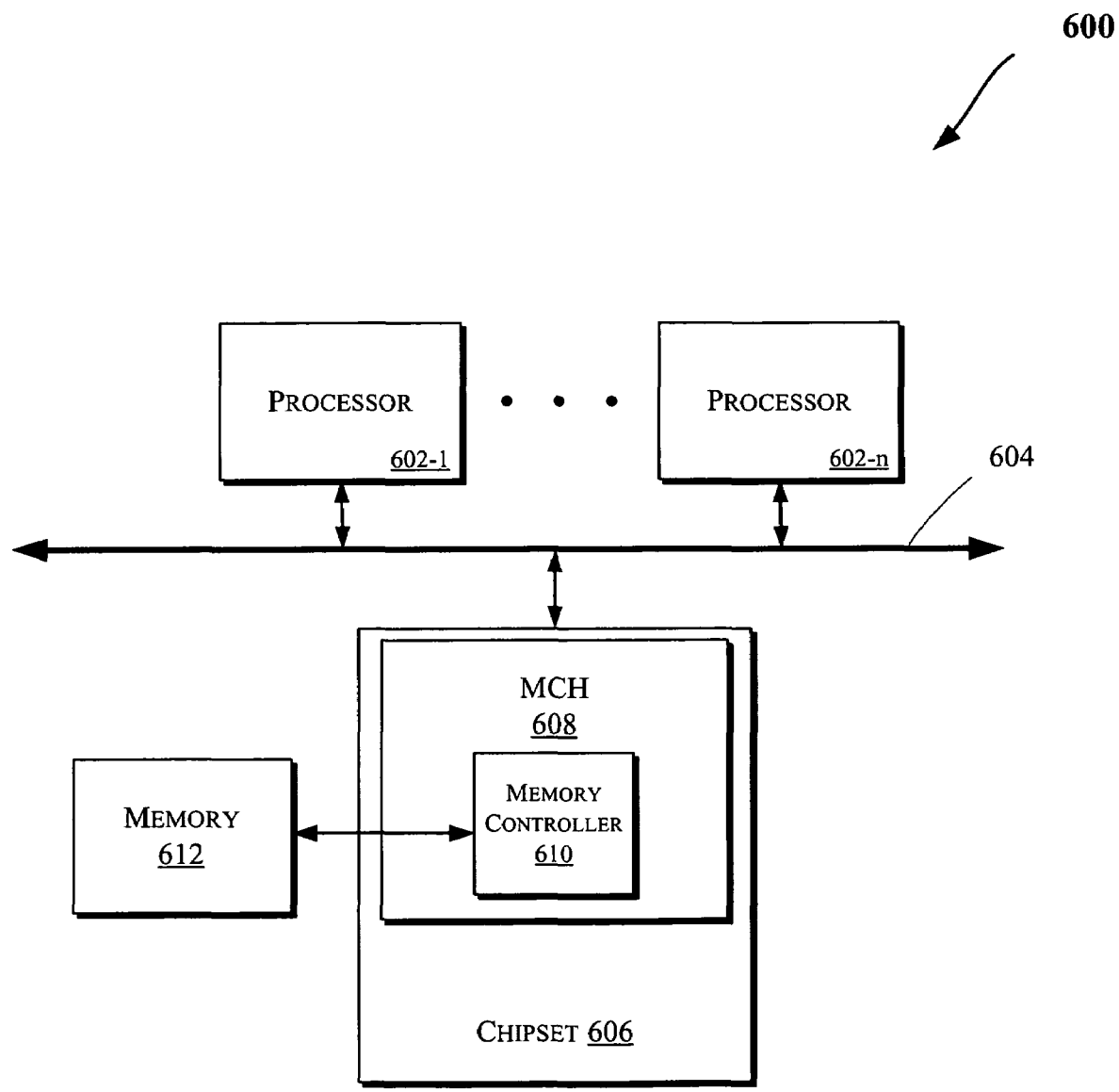
FIG. 6 illustrates a block diagram of a network computing system in accordance with an embodiment of the invention.

FIG. 6 illustrates a block diagram of a network computing system 600 in accordance with an embodiment of the invention. The computing system 600 may comprise the system 200 of FIG. 2 and/or the core 300 of FIG. 3. The computing system 600 includes one or more processors 602 (e.g., 602-1 through 602-n) coupled to an interconnection network (or bus) 604. The processors (602) may be any suitable processor such as those discussed with reference to FIGS. 1A and 1B. In one embodiment, the system 600 may provide a network processing system. For example, the processors (602) may have a multiple-core design which includes one or more general purpose processor cores (e.g., microengines (MEs)) and a core processor (e.g., to perform various general tasks within the network processor).

A chipset 606 may also be coupled to the interconnection network 604. The chipset 606 may include a memory control hub (MCH) 608. The MCH 608 may include a memory controller 610 that is coupled to a memory 612 that may be shared by the processors 602 and/or other devices coupled to the interconnection network 604. The memory 612 may store data and/or sequences of instructions that are executed by the processors 602, or any other device included in the computing system 600. Also, the memory 612 may store data corresponding to one or more data packets communicated over a network that is coupled to the system 600. For example, the system 600 may be coupled to a network through various communication devices (such as device 130 of FIG. 1B and/or device 196 of FIG. 1B) that may be coupled to the system 600 through the chipset 606.

In an embodiment, the memory 612 may include one or more volatile storage (or memory) devices such as those discussed with reference to FIG. 1A. Moreover, the memory 612 may include nonvolatile memory (in addition to or instead of volatile memory) such as those discussed with reference to FIG. 1A. Hence, the computing system 600 may include volatile and/or nonvolatile memory (or storage). Additionally, multiple storage devices (including volatile and/or nonvolatile memory) may be coupled to the interconnection network 604.

In various embodiments of the invention, the operations discussed herein, e.g., with reference to FIGS. 1-5, may be implemented as hardware (e.g., logic circuitry) and/or software that is provided as a computer program product, which may include a machine-readable or computer-readable medium having stored thereon instructions used to program a computer to perform a process discussed herein. The machine-readable medium may include any suitable storage device such as those discussed with respect to FIGS. 1-3.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment of the invention" or "an embodiment of the invention" means that a particular feature, structure, or characteristic described in connection with the embodiment of the invention is included in at least an implementation. The appearances of the phrase "in one embodiment of the invention" in various places in the specification may or may not be all referring to the same embodiment of the invention.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
  a first logic to generate a first signal indicative of execution of a breakpoint instruction by a processor of a multiprocessor system; and
  a second logic to generate a second signal, in response to the first signal, indicative of execution of the breakpoint instruction to one or more processors of the multiprocessor system, wherein the processor comprises a third logic to generate a third signal indicative of whether the processor is to be halted once it receives the second signal, wherein the second logic is to generate the second signal independent of an execution state of the one or more processors of the multiprocessor system.

2. The apparatus of claim 1, wherein the one or more processors of the multiprocessor system are processor cores on a same integrated circuit die.

3. The apparatus of claim 1, wherein the multiprocessor system is a network processor.

4. The apparatus of claim 1, wherein the multiprocessor system is one of a symmetrical multiprocessor or an asymmetrical multiprocessor.

5. The apparatus of claim 1, wherein the third logic comprises an AND gate.

6. The apparatus of claim 1, wherein the first logic comprises a fetch and execution unit.

7. The apparatus of claim 1, wherein the first logic comprises an instruction decoder.

8. The apparatus of claim 1, wherein the second logic comprises an OR gate.

9. The apparatus of claim 1, wherein the processor comprises an enable register to indicate that the processor is to be halted.

10. The apparatus of claim 1, wherein the processor comprises an execution history buffer to store information corresponding to one or more events of a thread that runs on that processor.

11. The apparatus of claim 1, wherein the processor is a processor core of a network processor.

12. A method comprising:
  generating a first signal in response to execution of a breakpoint instruction by a processor of a multiprocessor system;
  generating a second signal, in response to the first signal, indicative of execution of the breakpoint instruction to one or more processors of the multiprocessor system;
  generating a third signal indicative of whether the processor is to be halted once it receives the second signal; and
  generating the second signal independent of an execution state of the one or more processors of the multiprocessor system.

13. The method of claim 12, further comprising halting one or more processors of the multiprocessor system in response to the second signal.

14. The method of claim 12, wherein one or more processors of the multiprocessor system execute a plurality of threads of a multithreaded application program.

15. The method of claim 12, wherein one or more processors of the multiprocessor system communicate directly or indirectly.

16. The method of claim 12, further comprising generating a third signal indicative of whether the processor is to be halted immediately.

17. The method of claim 12, further comprising tracing back one or more activities of one or more threads executing on processors of the multiprocessor system by accessing an execution history buffer.

18. The method of claim 12, further comprising tracing back one or more activities of one or more threads executing on processors of the multiprocessor system prior to the execution of the breakpoint instruction.

19. A system comprising:
   a volatile memory to store a breakpoint instruction; and
   a multiprocessor system that comprises:
      a first logic to generate a first signal indicative of execution of the breakpoint instruction by a processor of the multiprocessor system; and
      a second logic to generate a second signal, in response to the first signal, indicative of execution of the breakpoint instruction to one or more processors of the multiprocessor system independent of an execution state of the one or more processors of the multiprocessor system, wherein the processor comprises a third logic to generate a third signal indicative of whether the processor is to be halted once it receives the second signal.

20. The system of claim 19, further comprising an audio device.

21. The system of claim 19, wherein the memory is one or more of a RAM, DRAM, SRAM, or SDRAM.

22. The system of claim 19, wherein the multiprocessor system is one of a symmetrical multiprocessor or an asymmetrical multiprocessor.

23. The system of claim 19, wherein the multiprocessor system is a network processor.

* * * * *